Jan. 14, 1969

JAMES E. WEBB
ADMINISTRATOR OF THE NATIONAL AERONAUTICS
AND SPACE ADMINISTRATION
PNEUMATIC SYSTEM FOR CONTROLLING AND ACTUATING
PNEUMATIC CYCLIC DEVICES
Filed April 20, 1966

3,421,549

Donald E. Van Arnam
Kyle W. Charlton
INVENTORS

BY J. McCoy
Deude Faulconer
ATTORNEYS

United States Patent Office 3,421,549
Patented Jan. 14, 1969

1

3,421,549
PNEUMATIC SYSTEM FOR CONTROLLING AND
ACTUATING PNEUMATIC CYCLIC DEVICES
James E. Webb, Administrator of the National Aeronautics and Space Administration, with respect to an invention of Donald E. Van Arnam, Surfside, and Kyle W. Charlton, La Mirada, Calif.
Filed Apr. 20, 1966, Ser. No. 545,229
U.S. Cl. 137—624.14          13 Claims
Int. Cl. F17d 3/00; F16k 31/08

ABSTRACT OF THE DISCLOSURE

A fully pneumatic system for accurately cyclically controlling a pneumatic device for extended periods including a supply of pneumatic fluid, pressure reducing means, first and second conduit means from the pressure reducing means with flow restricting means to regulate the pressure in the first conduit. Both conduits are attached to a pneumatic oscillator which is in the form of a spool valve having adjustable volume chambers. The oscillator has first cooperative passage means for directing fluid from the first conduit to the right hand volume chamber and venting the left volume chamber in one position and directing fluid to the left hand volume chamber and venting the right hand chamber in a second position and second cooperative passage means for directing fluid from the second conduit to the controlled device in the first position and venting the device in the second position. The adjustable chamber allows the relative time fluid as delivered or vented to be regulated. Magnets are provided at each end to provide snap action.

---

The invention described herein was made in the performance of work under a NASA contract and is subject to the provisions of Sec. 305 of the National Aeronautics and Space Act of 1958, Public Law 85–568 (72 Stat. 435; 42 U.S.C. 4257).

During a spaceflight, operators of manned space vehicles spend most of their time in a weightless condition. It appears that prolonged periods of such weightlessness may cause a "space sickness" which is similar to the sickness experienced by people confined to beds or chairs for long periods of time. This "sickness" which exhibits no adverse symptoms during flight has caused some operators to experience dizziness upon their attempting to stand upright after they return to earth.

Due to limited data available, the exact cause of this sickness has not yet been positively determined. One hypothesis is that the blood vessels in the operator's legs dilate from inactivity in space and that prolonged periods of weightlessness cause these blood vessels to temporarily lose their ability to contract after they dilate. This inability of the blood vessels to dilate causes blood circulation to slow down and prevents the vessels from maintaining a normal blood pressure once the operator returns to earth's gravity.

Tilt table and bed rest studies have indicated that periodic inflation and deflation of pneumatic cuffs positioned around the proximate attachment of the body's lower extremities (thighs) is beneficial in conditioning the vascular reflex mechanisms to aid in maintaining proper blood circulation during periods of inactivity. This periodic inflation of the pneumatic cuffs artificially induces a hydrostatic pressure gradient in the lower venous system causing distension of the blood vessels and simulation of the vascular reflex mechanisms. By alternately inflating the cuffs during flight to squeeze the legs for a short period of time and then deflating the cuffs to allow the blood to flow normally, it is possible to simulate to some degree the pressure normally exerted on the body's blood vessels under earth's gravity conditions.

In order to accurately control the inflation-deflation cycle of the cuffs and to insure that this cycle will remain substantially constant over long periods of time, a control system having a timing mechanism with an accurate reproducible, switching cycle is required. There are several electronic timers available which are capable of maintaining the required cycle but due to limited electrical power aboard present spacecraft, the use of such timers is undesirable. Present requirements call for a self-sustaining pneumatic system which can carry out the above mentioned operation independently of the spacecraft's electrical supply. Also, such a pneumatic system is desirable when inflatable cuffs are used in treating bed patients who are confined to oxygen tents or high oxygen atmospheres since there is no danger of electrical sparking or the like with a pneumatic system. Such a system requires a fully pneumatic timing mechanism which can reproduce its switching cycle over long periods of operation.

Prior pneumatic timers, such as actuators for automobile windshield wipers, are unacceptable for controlling the present inflation-deflation cycle since these actuators are unable to maintain a reproducible cycle over the extended periods of time required. Such actuators utilize a spool valve which is shiftable by air pressure for carrying out their switching function. As the pressure builds up on one side of the spool valve, it gradually approaches the force necessary to just overcome the friction of the valve and to start the valve moving. The valve tends to be sluggish at this equilibrium or shifting point thereby causing the movement of the valve and hence the timing cycle to be irregular and nonreproducible.

The present invention provides a fully pneumatic system which is capable of accurately controlling the inflation and deflation of expansible cuffs for extended periods of time. The present system comprises a pressure vessel for storing the operating fluid for the system, an on-off valve, pressure regulators for reducing the pressure of the fluid to safe operating levels, safety pressure relief valves, a pneumatic oscillating mechanism for cyclically inflating and deflating the cuffs, and a restricting means for regulating flow of fluid to the oscillating mechanism.

The oscillating mechanism or oscillator of the system is capable of maintaining an accurate and reproducible switching cycle for long periods of operation. The oscillator is comprised of a nonmagnetic body in which a magnetic spool valve is slidably positioned. This spool valve moves between two distinct positions within the body and connects different ports and passages in each position to thereby establish two separate flow patterns through the oscillator; one flow pattern inflates the cuffs and the other deflates the cuffs. To shift the spool valve, adjustable volume chambers are provided in the body, one at each end of the valve. Also, a magnet is located at each end of the valve to provide a snap-like movement of the valve whenever the oscillator switches position as will be more fully explained below.

The operation of the system is as follows. The on-off valve is opened to allow fluid from the pressure tank to flow through a first pressure regulator which reduces the pressure of the fluid to an operating level. The fluid then branches into two different conduits; one for switching the oscillator, the second for inflating the cuffs. Both conduits which are connected to the oscillator contain additional pressure regulators to further reduce the pressure of the fluid to desired levels and both contain pressure relief valves to insure safe operation of the system. The fluid which is used for switching the oscillator also passes through a restricting means before it reaches the oscillator. This restricting means, which is interchangeable, serves as part of the timing mechanism which determines the actual switching cycle of the oscillator as will be more fully explained below.

After passing through the restricting means, the fluid used for switching the oscillator enters either the volume chamber at the right end or the volume chamber at the left end of the body, depending on the position of the spool valve. If the valve is at the right end of the body, fluid will enter the right volume chamber. The porting in the body and the valve will vent the left chamber when the valve is in the right position. Also, when the valve is in this position, the magnet at the right end of the valve will attract and hold the valve until pressure in the right volume chamber is great enough to overcome the force of the magnet. The valve will then start to move toward the left position, with the magnet at the left end attracting the magnetic valve. This provides a snap action for the valve and insures quick and accurate movement of the valve each time it changes position. Additional porting in the body and valve of the oscillator will allow fluid from the second conduits to inflate the cuffs when the valve is in one position and will allow deflation of the cuffs when the valve is in the other position, which will be obvious from the detailed discussion below.

The actual construction, operation, and the apparent advantages of the invention will be better understood by referring to the drawings in which like numerals identify like parts in the different figures and in which.

Figure 1:
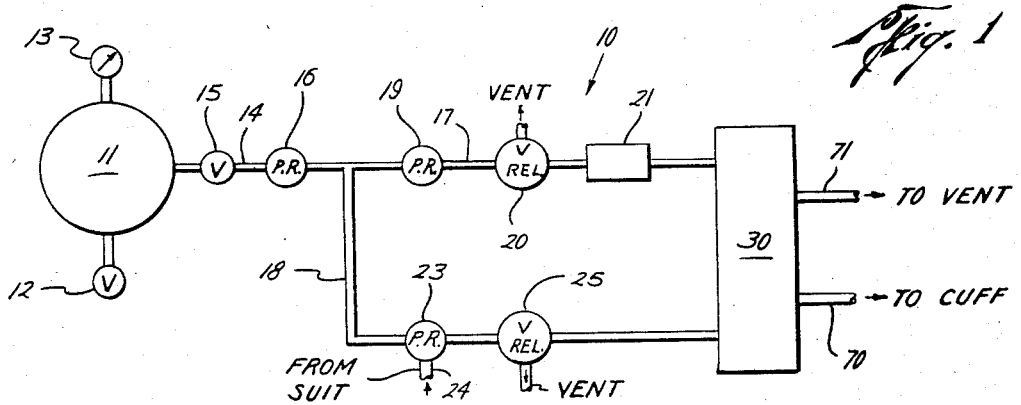
FIG. 1 is a schematic diagram showing the pneumatic system of the present invention.

Referring more particularly to the drawings, FIG. 1 discloses a self-sustaining, pneumatic system 10 capable of maintaining a reproducible cycle over long periods of operation. System 10 comprises storage vessel 11 which is preferably a spherical pressure tank capable of holding the desired operating fluid under extremely high pressure, e.g. 100% oxygen at 4500 p.s.i.g. Vessel 11 has fill valve 12 for charging the vessel with the fluid and a pressure transducer or gauge 13 for maintaining an accurate check of the pressure at all times. Line 14 is connected to vessel 11 and has an on-off valve 15 as a part thereof. A first pressure regulator 16 is positioned in line 14 on the up-stream side of valve 15 to reduce the tremendous pressure of the operating fluid to a much lower and safer working value, e.g. 300 p.s.i.g.

From regulator 16, line 14 branches into two conduits 17, 18. Conduit 17, which carries fluid to actuate pneumatic oscillator 30, has a second pressure regulator 19 therein which further reduces the pressure of the operating fluid, e.g. reduces pressure from 300 to 100 p.s.i.g. A safety pressure relief valve 20 is provided in conduit 17 to protect against failure of regulator 19 and is set to relieve at a pressure slightly greater than that normally supplied from regulator 19, e.g. if regulator 19 is set at 100 p.s.i.g., valve 20 would be set at 180 p.s.i.g. On the up-stream side of valve 20 in conduit 17 is a restricting means 21, such as length of capillary tubing, for accurately regulating the flow of fluid into oscillator 30. Means 21, as will be seen in the discussion of operation below, functions as a part of the timing means for the system to establish the exact cycle of operation required.

Conduit 18, which carries fluid to inflate the pneumatic cuffs (not shown) or to operate other pneumatic cyclic devices, has a third pressure regulator 23 therein to reduce the pressure of the fluid from regulator 16 to a safe operating level. Since, in the present illustration, the fluid is used to inflate cuffs which are positioned about the legs of the body, it is obvious that a low operating pressure is desired, e.g. 80 mm. of mercury. Also, if the cuffs are incorporated as a part of a pressurized suit as they normally are in space applications, a pressure reference line 24 from the suit is joined to regulator 23 so that the operating pressure supplied to the cuffs will always be the same set value above the pressure of the suit thereby insuring proper inflation of the cuffs even if the suit pressure fluctuates slightly.

Both conduits 17 and 18 are connected to oscillator 30 which comprises a body 31 of nonmagnetic material having a longitudinally extending bore 32 therethrough. Bore 32 is enlarged at each end thereof 33, 34 to form recesses 35, 36, respectively. Body 31 is also provided with cavities 37, 38 which fluidly communicate with recesses 35, 36, respectively, so that the recesses and cavities combine to form volume chambers 35–37 and 36–38 at each end of bore 31. Cavities 35, 36 are enlarged and threaded at their outer ends to receive adjustment plugs 39, 40, respectively. The plugs 39, 40 which have sealing means 41, 42, respectively, positioned thereon, can be threaded in and out of cavities 37, 38 to enlarge or decrease the volume of the chambers for a purpose explained below.

Positioned within bore 32 is a piston-like spool valve 44 comprised of magnetic material. Spool valve 44 is slidable within bore 32 between a left-hand position (FIG. 2) and a right-hand position (FIG. 3) and has a plurality of O-ring seals 45 positioned at set intervals along its length as is common in spool valves. Valve 44 also has an L-shaped passage 46, 47 in each end thereof opening from the face of the valve and terminating in a radially extending port 48, 49, respectively. Recesses 35, 36 are closed by inserts 50, 51, respectively, which are held in place by snap rings 54, 55, respectively. Secured to inserts 50, 51 by bonding or other means are ceramic magnets 56, 57, respectively, for a purpose that will become apparent below.

Body 31 has a radially extending passage 60 which communicates with longitudinally extending passage 62 which in turn terminates in radial port 63. Conduit 17 which carries the actuating fluid for the oscillator is connected to passage 60. Also in body 31 are radial ports 65 and 66 which are connected by a longitudinal passage 64. Conduit 18 which carries the fluid for inflating the cuffs (not shown) is connected to passage 67 in the oscillator. Line 70, which carries fluid from the oscillator to the cuffs, is connected to passage 68 in body 31. A vent line 71 is connected to passage 69 in the body.

The operation of control system 10 is as follows. After vessel 11 is charged with fluid under high pressure through valve 12, on-off valve 15 is opened to actuate system 10. Fluid flows from the vessel through pressure regulator 16 where the pressure of the fluid is substantially reduced. A portion of the fluid then flows through conduit 17 to a second pressure regulator 19 which further reduces the pressure of the fluid to a safer operating level. As long as regulator 19 functions properly, the fluid will pass through pressure relief valve 20 into restricting means 21. This means, which is preferably a length of capillary tubing, accurately regulates the rate of fluid flow to oscillator 30 and thereby forms part of the means for determining the actual switching cycle of the oscillator (the other part of this means being the volume chambers in body 31 of the oscillator). It should be recognized that different sized tubings will provide different timed cycles.

Figure 2:
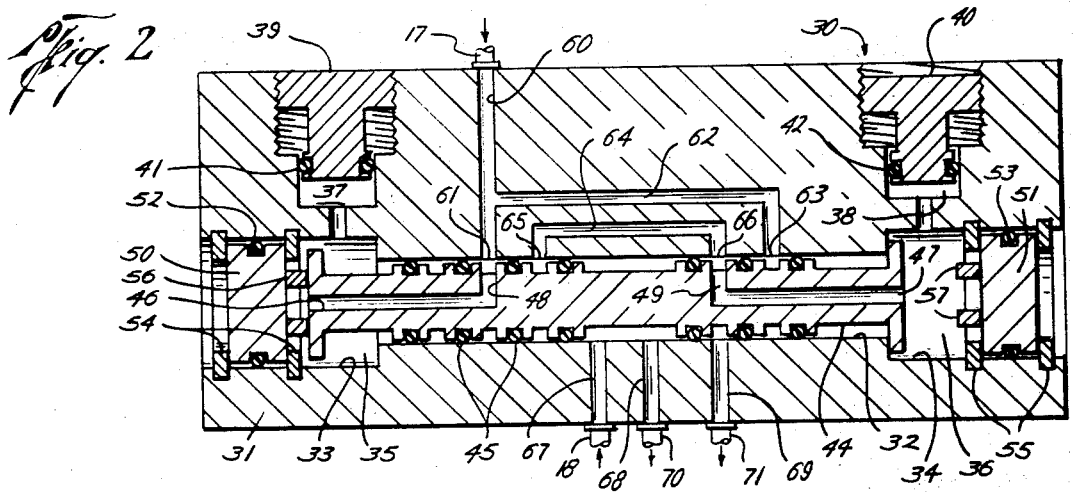
FIG. 2 is a cross-sectional view of the pneumatic oscillator of the present invention in a first position.

With oscillator 30 in the position shown in FIG. 2, fluid from conduit 17 will enter passage 60 and flows through port 48 into volume chamber 35–37. In this position chamber 36–38 will be vented through passages 47 and 71. It will be noted that plug 39 is not threaded into cavity 37 as far as plug 40 is threaded into cavity 38 so that the volume of chamber 35–37 is greater than the volume of chamber 36–38. By being able to adjust the volume of the two chambers, it is possible to establish reproducible cycles wherein the valve will remain in one position longer than it will remain in the other. Fluid will continue to flow into chamber 35–37 until the pressure therein builds to a force greater than the combined force of the magnets 56 on valve 44 and the frictional forces of the valve itself. When this occurs, valve 44 will begin to move to the right. Magnets 57 at the other end of body 31 will attract valve 44 and will provide a snap-like action to quickly move valve 44 to the position shown in FIG. 3.

Now, fluid entering passage 60 will flow through passages 62 and 47 into chamber 36–38, with chamber 35–37 being vented through passages 46, 64, and 71. When the pressure in chamber 36–38 is great enough to overcome the force of magnets 57 and the frictional forces on the valve, valve 44 will move back to its original position to start the cycle over again.

Figure 3:
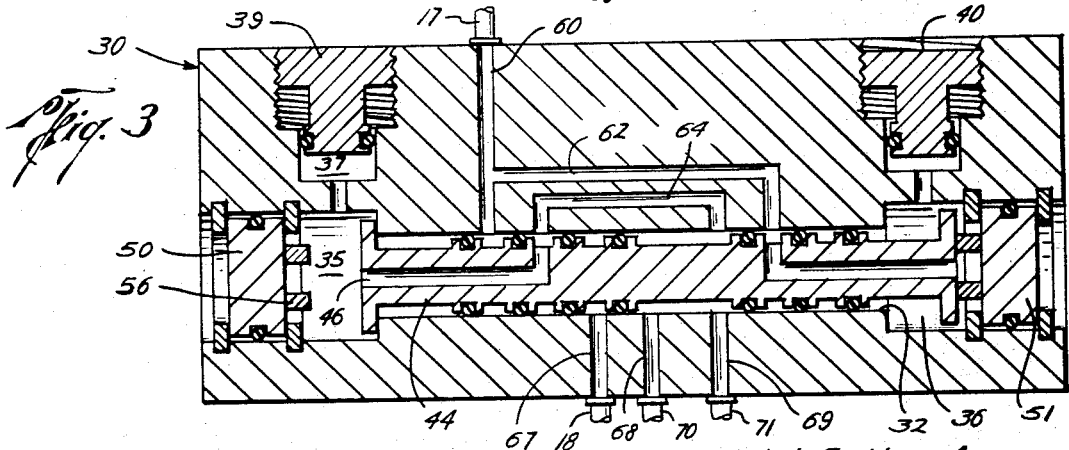
FIG. 3 is a cross-sectional view of the pneumatic oscillator of FIG. 2 when in a second position.

Fluid for inflating the cuffs or for operating other pneumatic devices flows from regulator 16 through conduit 18. It passes through pressure regulator 23, pressure relief valve 25 (which protects against failure of regulator 23), and enters oscillator 30 through passage 67. With the valve in the position shown in FIG. 2, the fluid will flow out passage 68 into line 70 which is adapted to be connected to the cuffs. When valve 44 shifts to a "deflate" position, as shown in FIG. 3, line 70 from the cuffs will vent through passage 68 and 69 in the oscillator with the fluid from conduit 18 being blocked by valve 44.

Although the present pneumatic control system has been described in conjunction with inflatable cuffs used in therapeutic applications, it should be obvious that the system can be used to control any pneumatically cycled device of this general type.

While a particular embodiment of the control system has been illustrated and described, it will be obvious that changes and modifications can be made without departing from the spirit of the invention and the scope of the appended claims.

What is claimed and desired to be secured by Letters Patent is:

1. A self-sustaining, pneumatic system for controlling and actuating cyclic pneumatic devices comprising:
   a vessel adapted for storing operating fluid for said system at high pressures;
   an on-off valve connected to said vessel for actuating said system;
   means connected to said on-off valve for reducing the pressure of the operating fluid to a desired operating level;
   a first and second conduit means connected to said pressure reducing means; and
   a pneumatic oscillator means connected to both said first and second conduit means and adapted to be connected to the device which is to be controlled, said oscillator means comprising:
      a body having a longitudinally extending bore therethrough, said body having closed right and left volume chambers, respectively, at each end of said bore;
      a spool valve means comprised of magnetic material and positioned in said bore for relative movement therein between a right-hand position and a left-hand position;
      magnetic means positioned in said right and left volume chambers, respectively, adapted to attract said spool valve means when said valve means is in or near said right-hand position or said left-hand position, respectively;
      said body and said valve means having cooperative passage means therein for directing fluid from said first conduit means to said right volume chamber and for venting said left volume chamber when said valve means is in said right-hand position, said body and said valve means having cooperative passage means therein for directing fluid from said first conduit means to said left volume chamber and for venting said right volume chamber when said valve means is in said left-hand position; and
      said body and said valve means also having cooperative passage means therein for directing fluid from said second conduit to the device to be controlled when said valve means is in said left-hand position, said body and valve means having further cooperative passage means therein for venting the device to be controlled when said valve means is in said right-hand position.

2. The system described in claim 1 including flow restricting means positioned in said first conduit to regulate flow to said oscillator means.

3. The system described in claim 2 including:
   pressure relief means positioned in both said first and second conduit means to protect against failure of said pressure reducing means.

4. The system described in claim 1 including:
   means on said body of said oscillator means for adjusting the volume of each of said volume chambers.

5. The system described in claim 4 wherein said body of said oscillator means is comprised of nonmagnetic material.

6. A pneumatic oscillator for cyclically controlling a pneumatic device comprising:
   a body having a longitudinally extending bore therethrough, said body having closed right and left volume chambers, respectively, at each end of said bore;
   a spool valve means comprised of magnetic material and positioned in said bore for relative movement therein between a right-hand position and a left-hand position;
   magnetic means positioned in said right and left volume chambers, respectively, adapted to attract said spool valve means when said valve means is in or near said right-hand position or said left-hand position, respectively;
   said body having a first passage means adapted to be connected to a fluid source for actuating said oscillator, a second passage means adapted to be connected to a fluid source for actuating the pneumatic device to be controlled, a third passage means adapted to be connected to the device to be controlled, and a fourth passage means forming a vent;
   said body and said valve means having a first cooperative passage means therein for directing fluid from said first passage means to said right volume chamber and for connecting said left volume chamber to said fourth passage means when said valve means is in said right-hand position, and from said first passage means to said left volume chamber and for connecting said right volume chamber to said fourth passage means when said valve means is in said left-hand position; and
   said body and said valve means having a second cooperative passage means therein for directing fluid from said second passage means to said third passage means when said valve means is in said left-hand position, and for connecting said third passage means to said fourth passage means when said valve means is in said right-hand position.

7. The oscillator described in claim 6 including:
   means on said body of said oscillator means for adjusting the volume of each of said volume chambers, whereby the time which the pneumatic oscillator directs fluid from the fluid source to the pneumatic device relative to the time that the pneumatic oscillator directs fluid from the pneumatic device to the vent can be regulated.

8. The oscillator described in claim 7 wherein the body of the oscillator is comprised of nonmagnetic material.

9. A pneumatic oscillator for cyclically controlling a pneumatic device comprising:
   a body having a longitudinally extending bore therethrough, said body having a closed, right and left volume chambers, respectively, at each end of said bore;
   means to adjust the volume in said chambers;

a spool valve means positioned in said bore for relative movement therein between a right-hand position and a left-hand position;

said body having a first passage means adapted to be connected to a fluid source for actuating said oscillator, a second passage means adapted to be connected to a fluid source for actuating the pneumatic device to be controlled, a third passage means adapted to be connected to the device to be controlled, and a fourth passage means forming a vent;

said body and said valve means having a first cooperative passage means therein for directing fluid from said first passage means to said right volume chamber and for connecting said left volume chamber to said fourth passage means when said valve means is in said right-hand position, and from said first passage means to said left volume chamber and for connecting said right volume chamber to said fourth passage means when said valve means is in said left-hand position; and said body and said valve means having a second cooperative passage means therein for directing fluid from said second passage means to said third passage means when said valve means is in said left-hand position, and for connecting said third passage means to said fourth passage means when said valve means is in said right-hand position, whereby the time which the pneumatic oscillator directs fluid from the fluid source to the pneumatic device relative to the time that the pneumatic oscillator directs fluid from the pneumatic device to the vent can be regulated.

10. The pneumatic oscillator specified in claim 9 including the body of the pneumatic oscillator being formed of non-magnetic material, magnetic means positioned at right and left end of each bore and the spool valve being formed of magnetic material.

11. A system for cyclically controlling and actuating fluid operated devices comprising:
means supplying fluid for said system at high pressures;
an on-off valve connected to said supply means for actuating said system;
means connected to said on-off valve for reducing the pressure of the supply fluid to a desired operating level;
a first and second conduit means connected to said pressure reducing means;
flow restricting means positioned in said first conduit to regulate the flow therein;
a fluid oscillator means connected to both said first and second conduit means and adapted to be connected to the device which is to be controlled, said oscillator means comprising:
a body having a longitudinally extending bore therethrough, said body having closed right and left volume chambers, respectively, at each end of said bore;
a spool valve means positioned in said bore for relative movement therein between a right-hand position and a left-hand position;
said body and said valve means having a first cooperative passage means therein for directing fluid from said first conduit means to said right volume chamber and for venting said left volume chamber when said valve means is in said right-hand position and for directing fluid from said first conduit means to said left volume chamber and for venting said right volume chamber when said valve means is in said left-hand position;
said body and said valve means having a second cooperative passage means therein for directing fluid from said second conduit to the device to be controlled when said valve means is in said left-hand position, and for venting the device to be controlled when said valve means is in said right-hand position.

12. The system specified in claim 11 including the oscillator having means to adjust the volume of each of said volume chambers whereby the time which the oscillator directs fluid from the said second conduit to the device to be controlled relative to the time the oscillator vents the device to be controlled can be regulated.

13. The system specified in claim 12 including the valve means being constructed of magnetic material and there are magnets at each end of the bore so that there will be a quick and accurate movement of the valve each time it changes position.

References Cited
UNITED STATES PATENTS

| | | | |
|---|---|---|---|
| 1,920,003 | 7/1933 | Chenault | 137—624.14 |
| 3,160,486 | 12/1964 | Busch | 137—624.14 X |
| 3,203,439 | 8/1965 | Beckett | 251—65 X |
| 3,326,236 | 6/1967 | Beckett | 137—624.14 |

ALAN COHAN, *Primary Examiner.*

U.S. Cl. X.R.

91—318; 251—65